United States Patent [19]

Osaki et al.

[11] Patent Number: 4,989,982
[45] Date of Patent: Feb. 5, 1991

[54] SPECTRAL SENSITIVITY CORRECTING DEVICE IN A PHOTOELECTRIC TRISTIMULUS COLORIMETER

[75] Inventors: Shigeru Osaki; Masami Sugiyama, both of Osaka, Japan

[73] Assignee: Minolta Camera Kabushiki Kaisha, Osaka, Japan

[21] Appl. No.: 389,486

[22] Filed: Aug. 4, 1989

[30] Foreign Application Priority Data

Aug. 5, 1988 [JP] Japan .................. 63-195400

[51] Int. Cl.$^5$ .................. G01J 3/51; G01N 21/27
[52] U.S. Cl. .................. 356/405; 356/419; 364/526
[58] Field of Search .................. 356/405, 407, 4065, 356/416, 419; 364/526

[56] References Cited

U.S. PATENT DOCUMENTS 4,773,761 9/1988 Sugiyama et al. .................. 356/405

FOREIGN PATENT DOCUMENTS 51-39055 10/1976 Japan .
62-289736 12/1987 Japan .

Primary Examiner—F. L. Evans
Attorney, Agent, or Firm—Price, Gess & Ubell

[57] ABSTRACT

A spectral sensitivity correcting device in a photoelectric tristimulus colorimeter which comprises three light receiving systems for the measurement of tristimulus values. Signals indicative of respective outputs from two of the light receiving systems multiplied by predetermined correction coefficients are added to or subtracted from an output from the remaining light receiving system so that spectral sensitivity characteristics of the remaining light receiving system can approach predetermined spectral sensitivity characteristics.

12 Claims, 4 Drawing Sheets

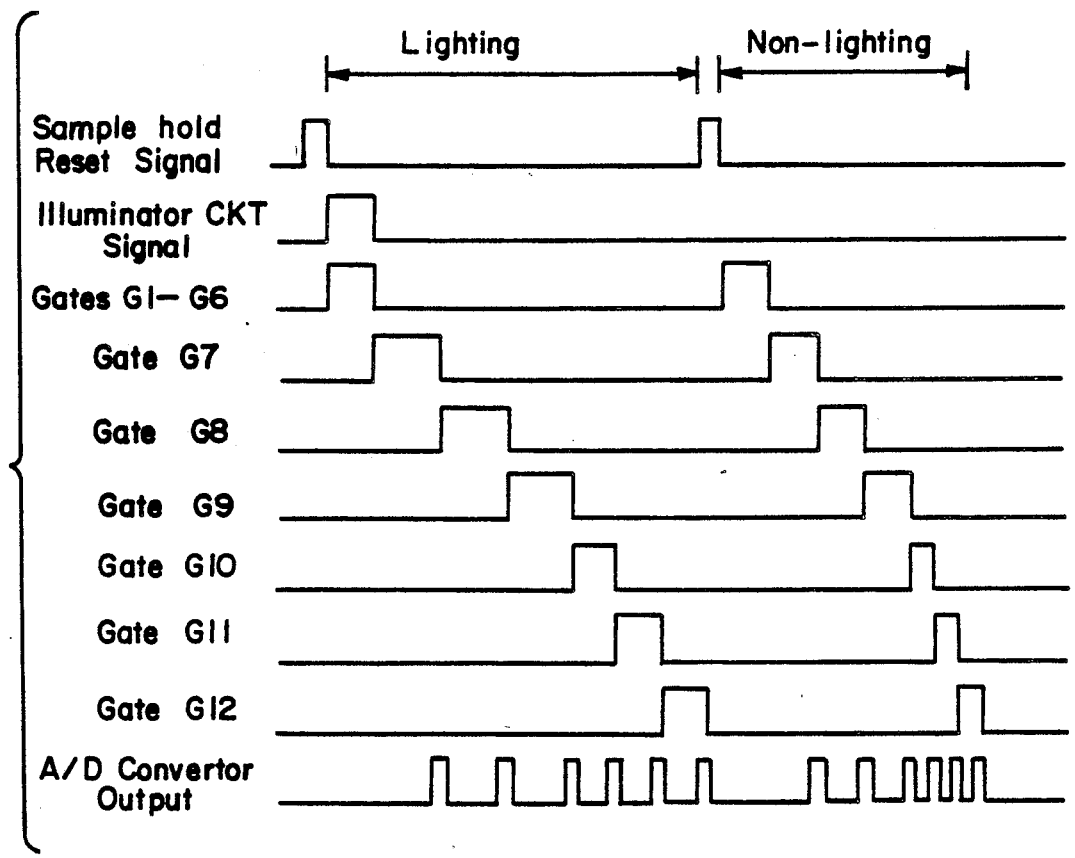
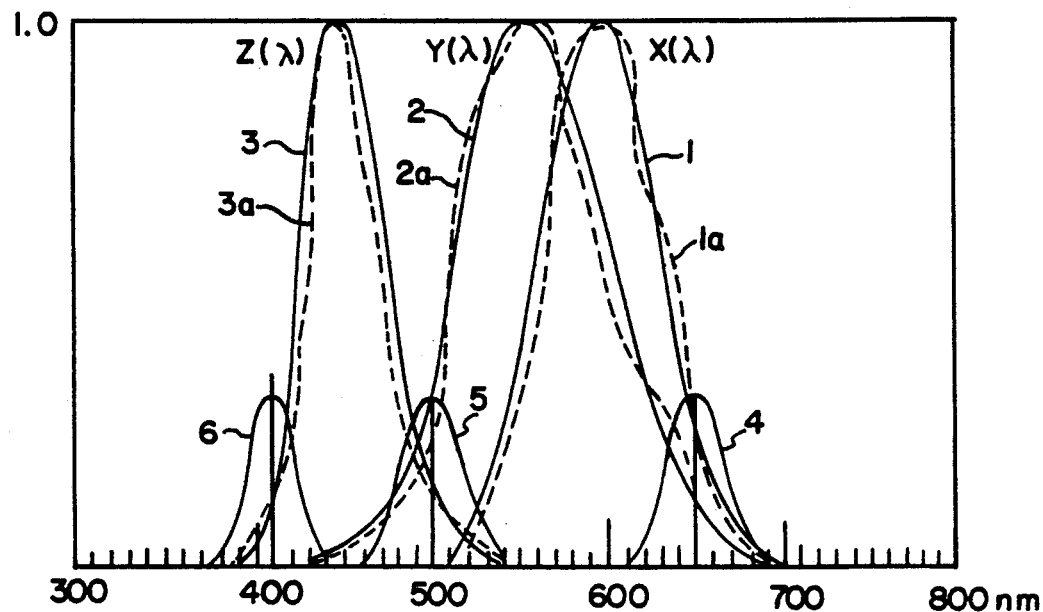

SPECTRAL SENSITIVITY CORRECTING DEVICE IN A PHOTOELECTRIC TRISTIMULUS COLORIMETER

BACKGROUND OF THE INVENTION

1. Field of the Invention

The present invention generally relates to a photoelectric tristimulus colorimeter and, more particularly, to a calibrating system in the photoelectric tristimulus colorimeter for calibrating the spectral sensitivity.

1. Description of the Prior Art

As standards for expressing color in term of quantified values, the CIE (Commission Internationale de l'Eclairage) has recommended, in 1931, the standard colorimetric observer in which the tristimulus values of the radiant flux coming from a given point or area in space and subsequently evoking a sensation of color after having irradiated the central part of the observer's retina exhibit such respective spectral sensitivity curves as shown by solid lines 1, 2 and 3 in the graph of FIG. 6. This signifies that a measurement of the color of an object using three photodetector systems having respective spectral sensitivities duplicating closely the CIE standard color-matching functions, that is, the tristimulus values, can provide a clue as to the color perceived by an observer when the latter receives the color stimuli.

To quantify the color, it is a general practice to utilize a spectrophotometer for the determination of the tristimulus values by measuring the spectral distributions of the radiant flux from a test piece, multiplying the respective measurements of the spectral radiant flux distributions by color-matching functions of the tristimulus values and integrating the resultant products individually. However, as a handy method for the quantification of the color, the use is made of a photoelectric colorimeter in place of the spectrophotometer, which colorimeter makes use of three light receiving elements having respective spectral sensitivities so chosen as to duplicate the spectral tristimulus values for the measurement of the radiant flux coming from an object to give a unique point in the chromaticity diagram.

The present invention pertains to the photoelectric tristimulus colorimeter. The accuracy with which the photoelectric tristimulus colorimeter can give accurate measurements depends on how and to what extend the spectral sensitivities of the three photodetector systems used therein can duplicate the CIE standard color-matching functions as closely as possible. However, the standard color-matching functions recommended by the CIE are not the functions that give respective peak sensitivities at particular wavelengths, but are continuous functions drawn for a wavelength range having a certain bandwidth containing three waveforms having different peak wavelengths which overlap with each other. Therefore, it is not easy to design each light receiving element of the photoelectric tristimulus colorimeter so as to duplicate the CIE standard color-matching functions and an error tends to be pronounced in sensitivity, which error may eventually result in an erroneous indication of the color through a display unit. A deviation in spectral sensitivity is found not only in the light receiving elements of an identical manufacturing lot, but also in those used in different colorimeters and, therefore, an error in measurement tends to be found among the colorimeters.

Various means have hitherto been suggested to compensate for the error. According to the prior art, the use has been made of a plurality of reference samples for calibration purpose each having a known chromaticity. In this instance, the measurement is corrected by determining outputs from the respective light receiving elements relative to various colors, calculating the ratios of actually measured values of the outputs from the light receiving elements relative to reference values corresponding to the known chromaticities of the reference samples (Reference value/Actually measured value) to give calibration constants, storing the calibration constants for the various colors in the form of a table, and selecting an optimum one of the calibration constants from the table which corresponds to the actually measured chromaticity of the sample for the actual correction of the measured value according to the selected calibration constant.

However, the conventional method has a problem in that the optimum calibration constant cannot be properly selected where the chromaticity of the sample measured lies intermediate between one calibration point and another calibration point since the calibration points are of a definite number. In such case, the error tends to occur and, also, since a reference reflector member is used in the determination of the calibration constant and various component parts of illuminating and light receiving systems intervene, effects vary depending on the presence or absence of gloss and a surface condition of an object to be measured. In an extreme case, the error tends to be amplified. While the calibration constant is varied depending on the point in the chromaticity diagram, the prior art method is not a method of correcting the spectral sensitivity curve itself and, therefore, no sufficient effect cannot be obtained.

While the spectral sensitivity characteristics of the light receiving system including filters used to divide rays of light to be measured into three primary color components and associated light receiving elements are required to duplicate the color-matching functions of the CIE standard observer, a deviation from the standards tends to occur in the actually manufactured colorimeter.

SUMMARY OF THE INVENTION

Accordingly, the present invention has been devised with a view to providing a highly precise photoelectric tristimulus colorimeter effective to eliminate the deviation discussed above.

To this end, the present invention provides an improved photoelectric tristimulus colorimeter wherein, after spectral sensitivity curves of three light receiving systems that determine respective tristimulus values have been measured, a deviation between the spectral sensitivity curves and specified spectral sensitivity curves is calculated, which deviation is zeroed by adding or subtracting the product of the spectral sensitivity curves of others of the three light receiving systems by a calibration coefficient.

Also, in order to improve the measurement accuracy, an additional light receiving system is added so that a correction value of the spectral sensitivity curve of such additional light receiving system is added to or subtracted from the spectral sensitivity curves of the tristimulus values.

BRIEF DESCRIPTION OF THE DRAWINGS

This and other objects and features of the present invention will become clear from the following description taken in conjunction with a preferred embodiment thereof with reference to the accompanying drawings in which like parts are designated by like reference numerals and in which:

FIG. 2 is a timing chart showing various signals appearing in the circuit of FIG. 1, shown in a timed relationship;

FIG. 3 is a graph showing an example of ideal spectral sensitivity curves and actual spectral sensitivity curves;

DETAILED DESCRIPTION OF THE EMBODIMENT

Before the description of the present invention proceeds, the principle of the present invention will first be discussed with reference to FIG. 8.

Figure 8:
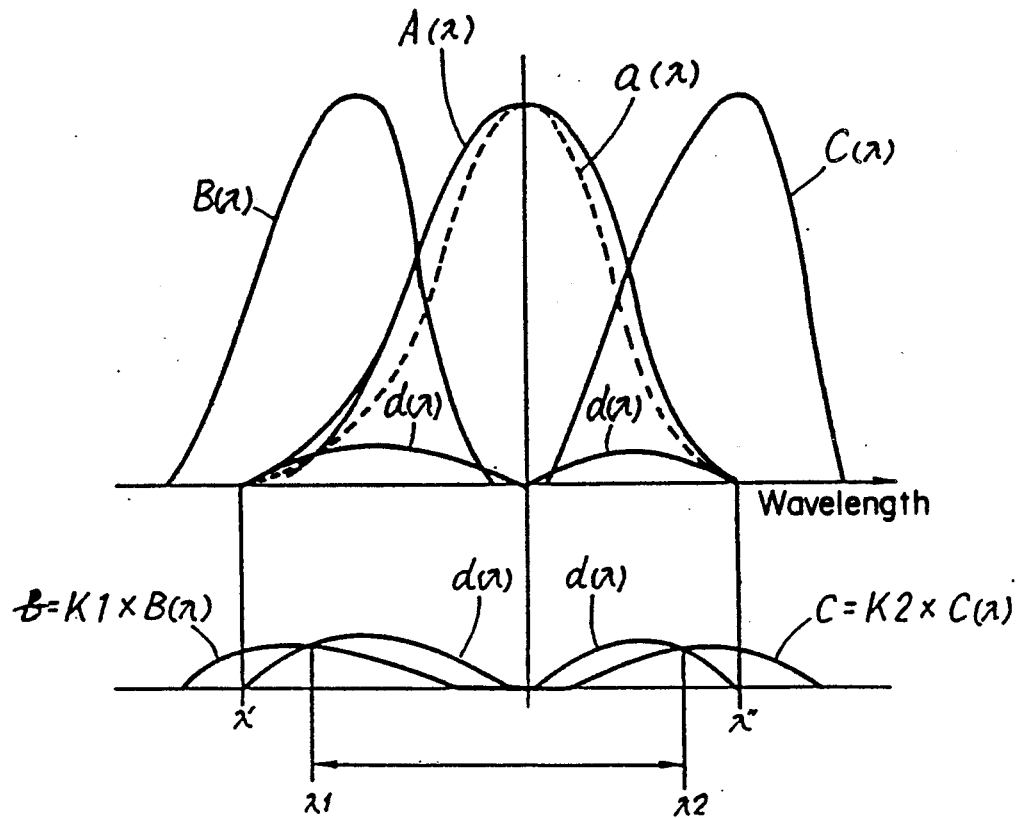
FIG. 8 is an explanatory diagram used to explain how the spectral sensitivity curves are corrected.

Referring to FIG. 8, the color-matching function which gives one of the tristimulus values is expressed by $A(\lambda)$ and the spectral sensitivity actually measured of the light receiving system which measures such one of the tristimulus values is expressed by $a(\lambda)$. A curve $d(\lambda)$ shown therein represents a curve exhibited by the difference between the color-matching function $A(\lambda)$ and the spectral sensitivity $a(\lambda)$. The present invention makes it possible to bring the curve $d(\lambda)$ close to respective sensitivity curves of the other light receiving systems used to measure the remaining tristimulus values with the use of a product multiplied by an appropriate coefficient. In FIG. 8, curves B and C represent those sensitivity curves of the light receiving systems used to measure the remaining two tristimulus values and b and c represent those sensitivity curves which are compressed after having been multiplied respectively by appropriate coefficients K1 and K2. It will readily be seen that, if the curves b and c are added to the curve a, the result curve will be closer to the curve A than to the curve a. In other words, by adding or subtracting the products of respective outputs of two of the three light receiving systems multiplied by the appropriate coefficients to or from the output of the remaining light receiving system, the sensitivity curve of such remaining light receiving system can be corrected. If the curve d is overlapped with the curves b and c, it will readily be seen that a slightly insufficient correction occurs at a wavelength within the range of the wavelength $\lambda 1$ to the wavelength $\lambda 2$ and a slightly excessive correction occurs at a wavelength outside such range. The error is zero at the wavelengths $\lambda 1$ and $\lambda 2$. The wavelength at which the error becomes zero can be adjusted depending on the manner by which the coefficients K1 and K2 are determined.

The reason that the approximate correction is possible with the foregoing method is because the sensitivity curves exhibited by the light receiving systems giving the respective tristimulus values have their skirt regions overlapping with each other. The difference between one color-matching function and the sensitivity curve of the light receiving system corresponding thereto may resemble the practically relatively simple curve d shown in FIG. 8 and, accordingly, it is possible to bring two peak regions of the curve d close to the sensitivity curves of two of the light receiving systems which are located on both sides of the remaining light receiving system, which sensitivity curves having been compressed at a constant value. If the sensitivity curve brought close to the ideal sensitivity curve in this way is expressed by $a'(\lambda)$, the following relationship can establish.

$$A(\lambda) \simeq a'(\lambda)$$
$$= a(\lambda) + K1 \cdot B(\lambda) + K2 \cdot C(\lambda)$$

If a spectrum of light from a sample is expressed by $S(\lambda)$, A' representative of the corrected output of the light receiving system now under consideration can be expressed by the following equation.

$$A' = \int S(\lambda) \cdot a'(\lambda) \cdot d\lambda$$
$$= \int S(\lambda) \cdot a(\lambda) \cdot d\lambda + K1 \cdot \int S(\lambda) \cdot B(\lambda) \cdot d\lambda +$$
$$K2 \cdot \int S(\lambda) \cdot C(\lambda) \cdot d\lambda.$$

Since the first one of the three integrals in the right-hand term of the above equation represents the output from the light receiving system now under consideration, and the second and third ones of the three integrals in the right-hand term of the above equation represent the respective outputs from the remaining two light receiving systems, it will readily be seen that the intended correction can be accomplished by adding or subtracting the product of the outputs from the remaining two light receiving systems multiplied by the appropriate constants to or from the output of the light receiving system now under consideration.

As can be expected from the foregoing explanation, the above described correcting method tends to bring about an error left by the correction. Since in practice this error can be negligible, it is recommended that, where a higher precision is desired, an additional light receiving system having an appropriate spectral sensitivity (for example, a relatively narrow sensitivity region having a peak center at the wavelength $\lambda'$ or $\lambda''$ shown in FIG. 8 and the product of the output from the additional light receiving system multiplied by an appropriate constant is then to be added to the above described correction.

Figure 1:
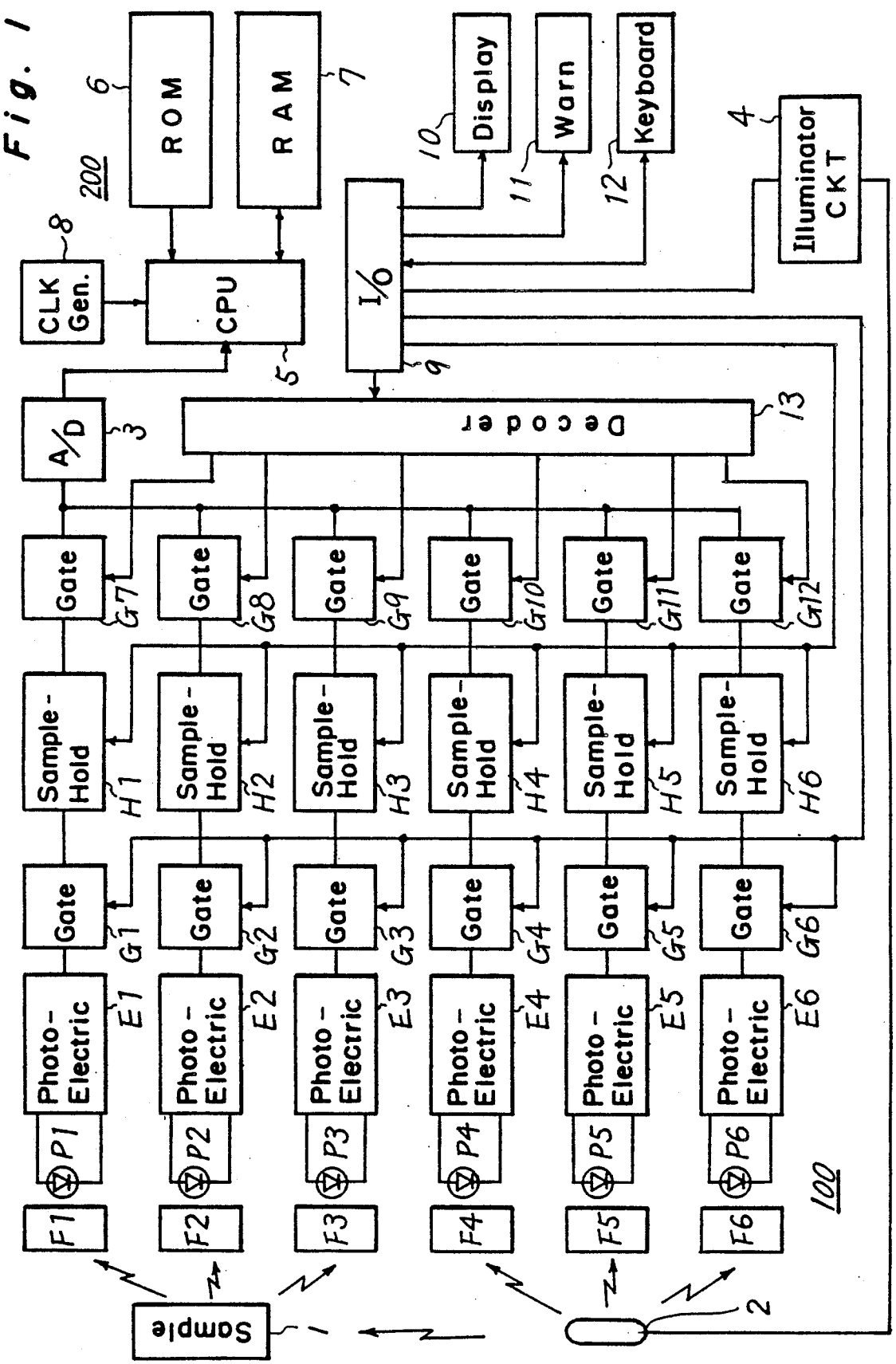
FIG. 1 is a circuit block diagram showing a photoelectric tristimulus colorimeter embodying the present invention.

Referring now to FIG. 1 illustrating a block circuit diagram of a photoelectric tristimulus colorimeter embodying the present invention, the colorimeter is so designed as to illuminate a sample with rays of light emitted from a built-in light source and to separate the color of the rays of light reflected from the sample for the light measurement. In order to avoid any adverse effect which may be brought about by external unwanted light, the built-in light source is so designed as to blink so that the subtraction can be effected between a light value measured during the lighting of the built-in light source and a light value measured during the non-lighting of the built-in light source. As shown in FIG. 1, the photoelectric colorimeter shown therein comprises a photoelectric converting section 100 and a data processing section 200.

The photoelectric converting section 100 includes six photodiodes P1 to P6 which serve as light sensors. The photodiodes P1 to P3 are used for the measurement of rays of light reflected by the sample 1 while the remaining photodiodes P4 to P6 are used for the measurement of rays of light emitted from a light source 2 for illuminating the sample 1, wherefore the ratio of the light value measured of the light source 2 relative to the light value measured of the sample 1 can be calculated to enable a measurement under a constant condition with flickering of the light source 2 eliminated.

More specifically, the light source 2 is controlled by an illuminator circuit 4 to emit rays of light towards the sample 1, and the rays of light originating from the light source 2 and subsequently reflected by the sample 2 are passed through optical filters F1 to F3 operable to separate the color of the light into primary color components which are subsequently detected by the photodiodes P1 to P3. On the other hand, rays of light from the light source 2 are passed through optical filters F4 to F6 operable to separate the color of the light into primary color components which are subsequently detected by the photodiodes P4 to P6. The photodiodes P1 to P6 are connected respectively with photoelectric converters E1 to E6 each operable to photoelectrically convert and amplify an electric signal indicative of an intensity of received light. The amplified electric signal emerging from each of the photoelectric converter E1 to E6 is temporarily stored in an associated sample-hold circuit H1 to H6 through an associated gate G1 to G6 and is then supplied to an analog-to-digital converter 3 through an associated gate G7 to G12. The converter 3 converts the incoming analog signal from each of the gates G7 to G12 into a digital signal which is subsequently inputted to a central processing unit (CPU) 5 which forms the heart of the data processing section 200. The measurement is carried out in a condition in which the sample is illuminated and, also, in a condition in which the sample is not illuminated, with various control signals supplied from the central processing unit 5 as shown in the timing chart of FIG. 2.

The data processing section 200 includes, in addition to the central processing unit 5, a read-only memory (ROM) 6 which stores programs such as a system control scheme and a color space conversion scheme, a random access memory (RAM) 7 for the storage of data such as color information, a clock generator 8, an input/output interface (I/O) port, a display unit 10 for the display of results of measurement, a keyboard 12 for instructing operation and also for entering input data and a decoder 13. This data processing section 200 is so designed as to subtract measurement data obtained during the non-lighting of the light source 2 (that is, when the sample 1 is not illuminated) from measurement data obtained during the lighting of the light source 2 (that is, when the sample 1 is illuminated) so that any possible unwanted effects which may be brought about by external light, a dark current of the light sensor and an offset and/or drift occurring in the circuitry can be cancelled, and therefore enables the following data processing procedure.

Each of spectral sensitivities $x(\lambda)$, $y(\lambda)$ and $z(\lambda)$ of light receiving systems associated respectively with the primary color components can be expressed by the product of a spectral transmittance characteristic of the associated filter multiplied by a spectral sensitivity characteristic of the associated light receiving element, and correction is possible by the following theory.

In the first place, the theory of correction of the spectral sensitivity will be discussed in connection with one of the spectral sensitivities, for example, the spectral sensitivity $x(\lambda)$. The color-matching function appropriate to the spectral sensitivity $x(\lambda)$ is expressed by $Xb(\lambda)$. Then, a correction function $C(\lambda)$ can be expressed as follows.

$$C(\lambda) = Xb(\lambda) - x(\lambda)$$

It is recommended to add the correction function $C(\lambda)$ to the spectral sensitivity $x(\lambda)$. By multiplying the spectral sensitivities $y(\lambda)$ and $z(\lambda)$, which are associated with the remaining two colors, times appropriate coefficients K1 and K2, respectively, the correction function $C(\lambda)$ can be approximately expressed. In other words, the spectral sensitivity $x'(\lambda)$ corrected as expressed by the following equation is determined.

$$x'(\lambda) = x(\lambda) + K1 \cdot y(\lambda) + K2 \cdot z(\lambda) \tag{1}$$

wherein K1 and K2 represent respective correction coefficients.

One of the tristimulus values, that is, the tristimulus value X', after the correction can be expressed by the following equation.

$$X' = K \cdot \int S(\lambda) \cdot x'(\lambda) \cdot R(\lambda) \cdot d\lambda \tag{2}$$

wherein $K = 100 / \int S(\lambda) \cdot y(\lambda) \cdot d\lambda$, $S(\lambda)$ represents a spectral distribution of the light source and $R(\lambda)$ represents the spectral solid angle reflectance of the sample.

Combining the equations (1) and (2) together results in the following equation (3).

$$\begin{aligned} X' &= K \cdot \int S(\lambda) \cdot [x(\lambda) + K1 \cdot y(\lambda) + K2 \cdot z(\lambda)] \cdot R(\lambda) \cdot d\lambda \\ &= K \cdot \int S(\lambda) \cdot x(\lambda) \cdot R(\lambda) \cdot d\lambda + \\ &\quad K1 \cdot K \cdot \int S(\lambda) \cdot y(\lambda) \cdot R(\lambda) \cdot d\lambda + \\ &\quad K2 \cdot K \cdot \int S(\lambda) \cdot z(\lambda) \cdot R(\lambda) \cdot d\lambda \end{aligned}$$

If in the left-hand term of the above equation the first, second and third integrals are expressed by X, Y and Z, respectively, X, Y and Z represent respective values measured of the tristimulus values before the correction and, therefore, the above equation can be rewritten as follows.

$$X' = X + K1 \cdot Y + K2 \cdot Z \tag{3}$$

Accordingly, if the correction expressed by the equation (3) is carried out using the tristimulus values obtained with the photoelectric tristimulus colorimeter, that is, output values from the light sensors, the spectral sensitivity can be corrected as expressed by the equation (1). Similarly, using the following equations (4) and (5), the spectral sensitivities $y(\lambda)$ and $z(\lambda)$ can be corrected.

$$Y' = Y + K3 \cdot X + K4 \cdot Z \tag{4}$$

$$Z' = Z + K5 \cdot X + K6 \cdot Y \tag{5}$$

wherein K3, K4, K5 and K6 represent respective correction coefficients.

Hereinafter, a method of calculating each of the correction coefficients expressed by the equations (3) to (5) will be described.

At the outset, the spectral sensitivities of the light receiving systems to be corrected are measured, followed by the determination of a correction coefficient required for the average value $\Delta_{AVE}$ of deviations $\Delta(\lambda)$ occurring within the region of wavelength, at which the correction is desired to be effected extensively, between the spectral sensitivities measured at appropriate intervals of wavelength and the ideal spectral sensitivity to become zero.

$$\Delta_{AVE} = \sum_{\lambda_s}^{\lambda_e} \Delta(\lambda)/N \tag{6}$$

wherein $\lambda_s$ represents the lowest wavelength within the wavelength region at which the correction is desired to be effected, $\lambda_e$ represents the highest wavelength within the wavelength region at which the correction is desired to be effected and N represents the number of data sampled.

A method of calculating the correction coefficient necessary for the correction expressed by the equation (3), that is, the correction expressed by the equation (1), to be carried out will now be discussed. Since it suffices to render the average value $\Delta_{AVE}$ in the equation (6) to be zero, that is enough if the equation (7) can be established.

$$\begin{aligned}\Delta_{AVE} &= \sum_{\lambda_s}^{\lambda_e} \Delta(\lambda)/N \\ &= \left\{ \sum_{\lambda_s}^{\lambda_e} [x'(\lambda) - x_R(\lambda)] \right\}/N \\ &= \left\{ \sum_{\lambda_s}^{\lambda_e} [(x(\lambda) + K_1 y(\lambda) + K_2 z(\lambda)) - x_R(\lambda)] \right\}/N \\ &= 0\end{aligned} \tag{7}$$

wherein $X_R(\lambda)$ represents the ideal spectral sensitivity that provides a reference.

Rewriting the equation (7) results in the following equation (8).

$$\sum_{\lambda_s}^{\lambda_e} x(\lambda) + K_1 \sum_{\lambda_s}^{\lambda_e} y(\lambda) + K_2 \sum_{\lambda_s}^{\lambda_e} z(\lambda) - \sum_{\lambda_s}^{\lambda_e} x_R(\lambda) = 0 \tag{8}$$

Since the equation (8) contains two unknown correction coefficients (K1 and K2), the equation (8) should be set up for two different wavelength regions to give simultaneous equations. By solving the simultaneous equations, the correction coefficients K1 and K2 can be obtained. With respect to the corrections expressed by the equations (4) and (5), the correction coefficients can be obtained in a similar method as shown by the following equations (9) and (10).

$$\sum_{\lambda_s}^{\lambda_e} y(\lambda) + K_3 \sum_{\lambda_s}^{\lambda_e} x(\lambda) + K_4 \sum_{\lambda_s}^{\lambda_e} z(\lambda) - \sum_{\lambda_s}^{\lambda_e} y_R(\lambda) = 0 \tag{9}$$

$$\sum_{\lambda_s}^{\lambda_e} z(\lambda) + K_5 \sum_{\lambda_s}^{\lambda_e} x(\lambda) + K_6 \sum_{\lambda_s}^{\lambda_e} y(\lambda) - \sum_{\lambda_s}^{\lambda_e} z_R(\lambda) = 0 \tag{10}$$

The foregoing description applies where the correction is carried out with the use of the three sensors X, Y and Z with no new sensor added. However, where a required high accuracy cannot be accomplished with the system of the foregoing embodiment, it can be accomplished if a new sensor is added so that an output from such new sensor can be used for the correction. Where the new sensor is additionally employed, the correction equations can be generally expressed as follows according to a theory similar to the theory discussed in connection with the case in which the three sensors are employed.

$$X' = X + K_1'Y + K_2'Z + \sum_1^N L_{xi} \cdot N_i \tag{11}$$

$$Y' = Y + K_3'X + K_4'Z + \sum_1^N L_{yi} \cdot N_i \tag{12}$$

$$Z' = Z + K_5'X + K_6'Y + \sum_1^N L_{zi} \cdot N_i \tag{13}$$

wherein K1' to K6' represent respective correction coefficients, Lxi, Lyi and Lzi represent correction coefficients to be multiplied by an output from the i-th sensor and Ni represents the output from the i-th sensor.

The foregoing equations (11) to (13) represent the respective correction equations applicable where N sensors such as those designated by $N_1$ to $N_N$ are additionally employed. Since the equations for giving the correction coefficients applicable in this case can be expressed as follows.

$$\sum_{\lambda_s}^{\lambda_e} x(\lambda) + K_1' \sum_{\lambda_s}^{\lambda_e} y(\lambda) + K_2' \sum_{\lambda_s}^{\lambda_e} z(\lambda) + \tag{14}$$

$$\sum_1^N \left[ L_{xi} \sum_{\lambda_s}^{\lambda_e} n_i(\lambda) \right] - \sum_{\lambda_s}^{\lambda_e} x_R(\lambda) = 0$$

$$\sum_{\lambda_s}^{\lambda_e} y(\lambda) + K_3' \sum_{\lambda_s}^{\lambda_e} x(\lambda) + K_4' \sum_{\lambda_s}^{\lambda_e} z(\lambda) + \tag{15}$$

$$\sum_1^N \left[ L_{yi} \sum_{\lambda_s}^{\lambda_e} n_i(\lambda) \right] - \sum_{\lambda_s}^{\lambda_e} y_R(\lambda) = 0$$

$$\sum_{\lambda_s}^{\lambda_e} z(\lambda) + K_5' \sum_{\lambda_s}^{\lambda_e} x(\lambda) + K_6' \sum_{\lambda_s}^{\lambda_e} y(\lambda) + \tag{16}$$

$$\sum_1^N \left[ L_{zi} \sum_{\lambda_s}^{\lambda_e} n_i(\lambda) \right] - \sum_{\lambda_s}^{\lambda_e} z_R(\lambda) = 0$$

wherein $n_i(\lambda)$ represents the spectral sensitivity of the newly added i-th sensor.

In order to determine the correction coefficients from the equations (14) to (16), since each of these equations contains (N+2) unknown correction coefficients, and if simultaneous equations are set up for (N+2) wavelength regions, the correction coefficients can be obtained as solutions of the (N+2) simultaneous equations.

Examples of the sensors that can be newly added are tabulated below.

TABLE 1

| | Peak Wavelength | Half Value Width |
|---|---|---|
| Sensor 1 | 650 nm | 40 nm |
| Sensor 2 | 500 nm | 40 nm |

TABLE 1-continued

| | Peak Wavelength | Half Value Width |
|---|---|---|
| Sensor 3 | 410 nm | 30 nm |

The spectral sensitivities of the sensors shown in Table 1 and examples of the ideal and actual spectral sensitivities for $x(\lambda)$, $y(\lambda)$ and $z(\lambda)$ are shown in FIG. 3. The ideal spectral sensitivities are indicated by the solid lines 1 to 3, the spectral sensitivities before the correction are indicated by the broken lines 1a to 3a, and the spectral sensitivities of the sensors shown in Table 1 to be newly added are indicated by the solid lines 4 to 6.

Figure 4:
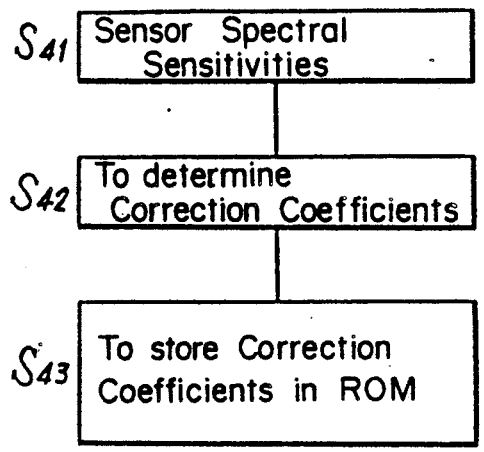
FIG. 4 is a flowchart showing the sequence of procedures taken during the manufacture of the colorimeter.

Procedures during the manufacture are such as shown in FIG. 4. Referring to FIG. 4, the respective spectral sensitivities of the three sensors X, Y and Z are measured at step S41, followed by the determination of the correction coefficients at step S42 according to a calculating method in which the equations (14) to (16) are utilized. The correction coefficients so determined are then stored at step S43 in a read-only memory (ROM) built in the colorimeter.

Figure 5:
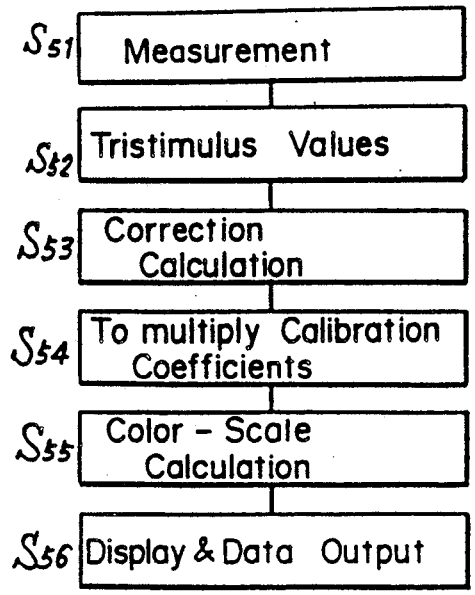
FIG. 5 is a flowchart showing the sequence of procedures taken during a measurement.

The flow of calculation from the actual measurement to the display of results of the calculation is shown in FIG. 5. Referring now to FIG. 5, a measurement is carried out at step S51, followed by the determination of the tristimulus values at step S52 by performing the calculation according to the following equations (17) to (19).

$$X = [F(1) - D(1)]/[F(4) - D(4)] \quad (17)$$
$$Y = [F(2) - D(2)]/[F(5) - D(5)] \quad (18)$$
$$Z = [F(3) - D(3)]/[F(6) - D(6)] \quad (19)$$

wherein F(1) to F(3) represent respective values measured of the sample during the lighting of the light source, F(4) to F(6) represent respective values measured of the light source during the lighting of the light source, D(1) to D(3) represent respective values measured of the sample during the non-lighting of the light source, and D(4) to D(6) represent respective values measured of the light source during the non-lighting of the light source.

Subsequently and at step S52, using the tristimulus values X, Y and Z determined by the calculation using the equations (17) to (19) and the correction coefficients stored in the read-only memory (ROM), the correction calculation is carried out using the equations (11) to (13). Then, using the tristimulus values X', Y' and Z' determined according to the correction calculation and calibration coefficients $\alpha$, $\beta$ and $\gamma$ stored in the random-access memory (RAM), the calibration, that is, the sensitivity setting, is carried out at step S54 in the form as expressed by the following equations (20) to (22).

$$X_N = \alpha \cdot X' \quad (20)$$

$$Y_N = \beta \cdot Y' \quad (21)$$

$$Z_N = \gamma \cdot Z' \quad (22)$$

wherein $\alpha$, $\beta$ and $\gamma$ represent respective calibration coefficients.

The calibration coefficients $\alpha$, $\beta$ and $\gamma$ can be determined according to the following equations (23) to (25).

$$\alpha = Xo/Xo' \quad (23)$$

$$\beta = Yo/Yo' \quad (24)$$

$$\gamma = Zo/Zo' \quad (25)$$

wherein Xo, Yo and Zo represent the respective tristimulus values of a calibrating sample and Xo, Yo and Zo represent the respective tristimulus values which were obtained when the calibrating sample was measured.

Xo, Yo and Zo are beforehand inputted into the random access memory (RAM) built in the colorimeter. At step S55, various color-scale calculations are carried out using the tristimulus values $X_N$, $Y_N$ and $Z_N$ so determined in the manner as hereinabove described, results of the calculations being subsequently displayed and/or outputted to external devices at step S56.

Figure 6:
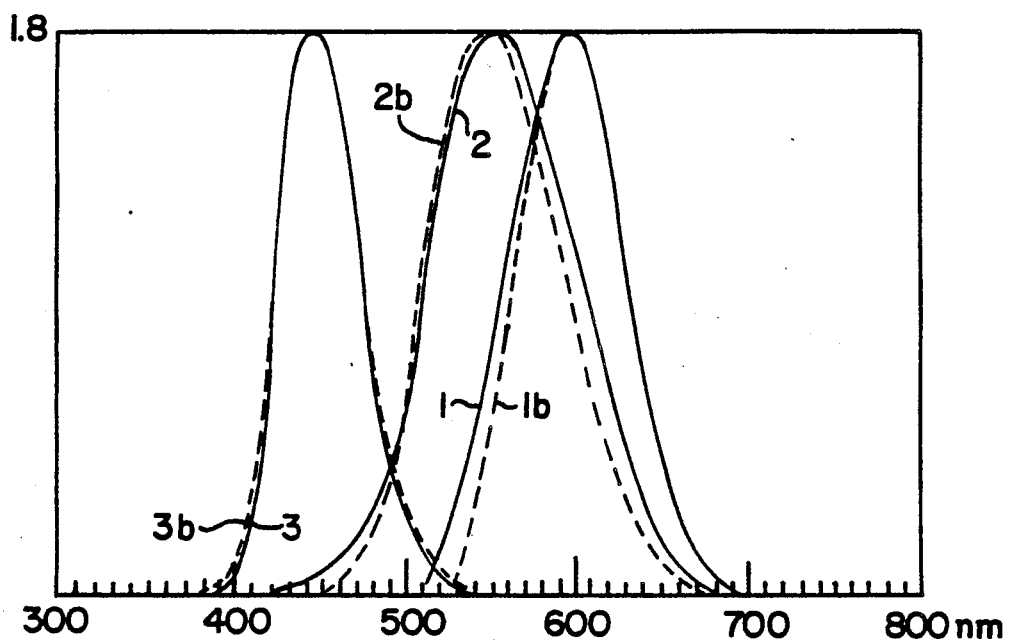
FIG. 6 is a graph showing the ideal spectral sensitivity curves and the spectral sensitivity curves before the latter are corrected.
Figure 7:
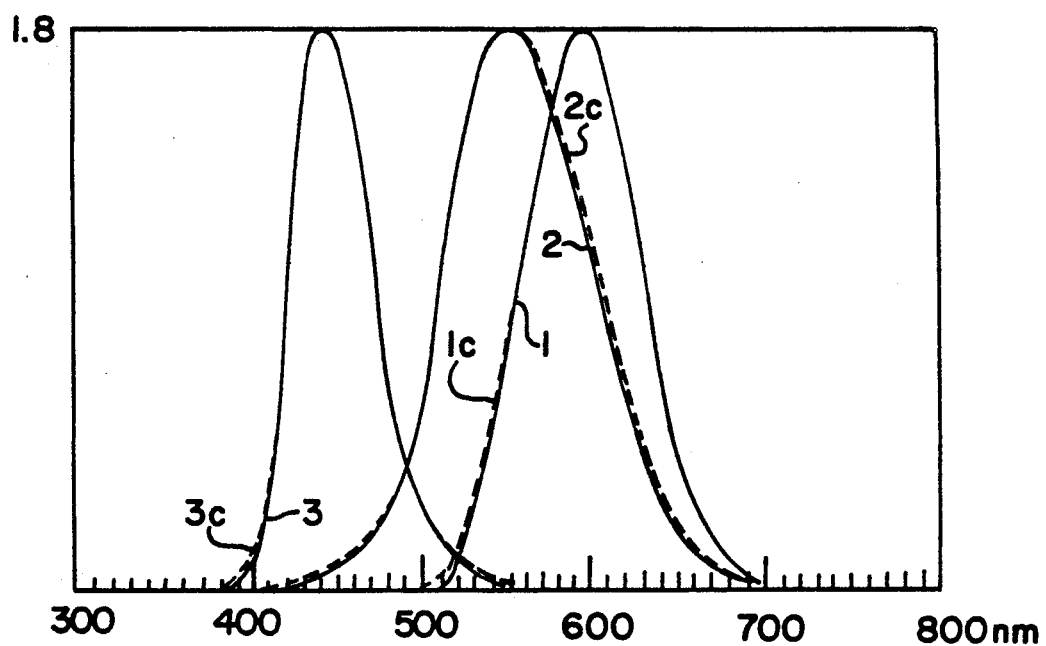
FIG. 7 is a graph showing the ideal spectral sensitivity curves and the spectral sensitivity curves after the latter have been corrected.

FIG. 6 illustrates the ideal spectral sensitivities (1 to 3) corresponding to the tristimulus values X, Y and Z and examples (1b to 3b) of the spectral sensitivity curves before the correction. What has been corrected with no extra sensor added to 1b to 3b, that is, what is obtained by the correction according to the equations (3) to (5) (It is to be noted that, even when N is chosen to be zero in the equations (11) to (13), the result remains the same.), are shown by 1c to 3c in FIG. 7. As can be understood from FIG. 6, no correction is substantially required for $z(\lambda)$, whereas $x(\lambda)$ requires a correction at a short wavelength side and, in the illustrated example, all of the coefficients K2, K5 and K6 employed in the equations (3) to (5) are chosen to be zero. The wavelength regions for which the equations (8) to (10) are set up are within the range of 420 to 490 nm, within the range of 500 to 580 nm and within the range of 580 to 700 nm.

For the ideal spectral sensitivity which provides the reference, any arbitrarily chosen spectral sensitivity can be used. For example, the average spectral sensitivity of all that are exhibited by the actually manufactured colorimeters may be employed. Also, if spectral sensitivity in fields of 10° angular subtense is chosen to be the ideal spectral sensitivity, it is possible to produce the spectral sensitivity for the 10° field while the spectral sensitivity for the 2° field remains the same, and, therefore, without the external addition of a sensor for the 10° field, it is possible to switch over between the 2° field and the 10° field by means of a software.

It is to be noted that, if the three sensors shown in Table 1 are employed, the correction is possible substantially all over the spectral sensitivities.

In the foregoing illustrated embodiment, the correction coefficient has been described as obtained by rendering the deviation $\Delta_{AVE}$ (See the equation (6).) of the spectral sensitivity from the ideal spectral sensitivity to be zero. However, as an alternative method, it may be determined by rendering an area of deviation from the ideal curve to become zero.

From the foregoing full description of the present invention, it is clear that, since arrangement has been made to correct the spectral sensitivity curves in each of the devices, an error resulting from a difference in sensitivity among the devices can be eliminated and, also, the correction effect will not be affected by the surface condition of the sample such as, for example, the presence or absence of a gloss and the correction effect will remain constant at different chromaticities with the measurement accuracy consequently increased.

While the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A spectral sensitivity correcting device in a photoelectric tristimulus colorimeter which comprises three light receiving systems for the measurement of tristimulus values and providing respective outputs thereof; means for providing correction coefficients to be added to the outputs of the light receiving systems; and correction means for correcting the outputs of the light receiving systems such that signals indicative of respective outputs from two of the light receiving systems multiplied by predetermined correction coefficients are added to or subtracted from an output from the remaining light receiving system such that the spectral sensitivity characteristics of the remaining light receiving system approach predetermined spectral sensitivity characteristics.

2. The device as claimed in claim 1, further comprising additional light receiving systems for correction purpose.

3. The device as claimed in claim 2, wherein for the additional light receiving systems a light receiving system having a peak wavelength at 650 nm and a half value width of 40 nm, a light receiving system having a peak wavelength at 500 nm and a half value width of 40 nm and a light receiving system having a peak wavelength at 410 nm and a half value width of 30 nm are employed.

4. The device as claimed in claim 1, wherein the predetermined spectral sensitivity characteristics are such as required for color-matching functions recommended by the Commission Internationale de l'Eclairage for 2° and 10° field angles.

5. A spectral sensitivity correcting method in a photoelectric tristimulus colorimeter which comprises the steps of:
measuring tristimulus values by means of three light receiving systems;
calculating correction coefficients to be added to respective outputs of the light receiving systems; and
correcting the output of the light receiving systems such that signals indicative of respective outputs from two of the light receiving systems, multiplied by predetermined correction coefficients, are added to or subtracted from an output from the remaining light receiving system such that spectral sensitivity characteristics of the remaining light receiving system approach predetermined spectral sensitivity characteristics.

6. A spectral sensitivity correcting device in a photoelectric tristimulus colorimeter which comprises; three light receiving systems for the measurement of tristimulus values; additional light receiving systems for correction purposes; and correction means for correcting the output of the light receiving systems such that a signal indicative of an output from an additional light receiving system, multiplied by a predetermined correction coefficient, is added to or subtracted from an output from another light receiving system such that spectral sensitivity characteristics thereof approach predetermined spectral sensitivity characteristics.

7. The device as claimed in claim 6, wherein the additional light receiving systems include a light receiving system having a peak wavelength at 650 nm and a half value width of 40 nm, a light receiving system having a peak wavelength at 500 nm and a half value width of 40 nm and a light receiving system having a peak wavelength at 410 nm and a half value width of 30 nm.

8. The device as claimed in claim 7, wherein the predetermined spectral sensitivity characteristics are such as required for color-matching functions recommended by the Commission Internationale de l'Eclairage for 2° and 10° field angles.

9. A spectral sensitivity correcting method in a photoelectric tristimulus colorimeter which comprises the steps of:
measuring tristimulus values with three light receiving systems providing respective outputs;
providing additional light receiving systems for correction purposes; and
correcting an output of a light receiving system such that a signal indicative of an output from an additional light receiving system, multiplied by a predetermined correction coefficient, is added to or subtracted from an output from the corresponding light receiving system such that spectral sensitivity characteristics thereof approach predetermined spectral sensitivity characteristics.

10. A spectral sensitivity correcting device in a photoelectric tristimulus colorimeter which comprises a plurality of light receiving systems for measuring tristimulus values and providing correction values; means for providing correction coefficients to be added to the tristimulus values measured by at least some of the light receiving systems; and correction means for correcting the tristimulus values measured by those light receiving systems such that signals indicative of respective measured tristimulus values of the light receiving systems are multiplied by predetermined correction coefficients and are added to or subtracted from an output from another light receiving system such that spectral sensitivity characteristics of the light receiving systems measuring the tristimulus values approach predetermined spectral sensitivity characteristics.

11. The device as claimed in claim 10, wherein light receiving systems for providing correction values include a light receiving system having a peak wavelength at 650 nm and a half value width of 40 nm, a light receiving system having a peak wavelength at 500 nm and a half value width of 40 nm, and a light receiving system having a peak wavelength at 410 nm and a half value width of 30 nm are employed.

12. The device as claimed in claim 10, wherein the predetermined spectral sensitivity characteristics are such as required for color-matching functions recommended by the Commission Internationale de l'Eclairage.

* * * * *